United States Patent Office 3,471,624
Patented Oct. 7, 1969

3,471,624
METHOD OF PREPARING A COSMETIC FORMULATION USEFUL AS A FACIAL MASK
Elizabeth Y. Youngblood, P.O. Box 45,
Battle Lake, Minn. 56515
No Drawing. Filed Nov. 8, 1966, Ser. No. 592,758
Int. Cl. A61k 7/00, 7/02
U.S. Cl. 424—362                                        6 Claims

ABSTRACT OF THE DISCLOSURE

A facial cream utilizing high percentages of epsom salt (magnesium sulphate) and ammonium alum in a water-in-oil emulsion with cholesterol and lanolin. The emulsion comprises about 48–50% epsom salt (magnesium sulphate), 5–11% ammonium alum, 1–2% lanolin, 9–12% cholesterol and 30–32% water.

BACKGROUND OF THE INVENTION

In the past, clay base masks have been employed as a facial cosmetic for the purpose of treating the skin and to reduce pores. Such a mask becomes hard and has a number of objectionable features. Also, in the past, alum and epsom salts have been employed in formulations for the treatment of the skin, but have not been employed in high concentrations with an improved cosmetic base that presents itself for advantageous use as a facial cream to smooth out wrinkles and retone the skin.

SUMMARY OF THE INVENTION

It is an object of this invention to provide an improved facial cream utilizing ammonium alum for its fast acting effect, coupled with slower acting epsom salts for their retoning and wrinkle smoothing effect on the skin in a water-in-oil emulsion employing cholesterol and lanolin. In this formulation a stabilizer, such as methyl cellulose, may be employed to provide an emulsion that has a high degree of stability and is highly effective in providing a finished facial cream of a high degree of quality, having a smooth texture, and medium-heavy consistency. The facial cream firms the tissues, reduces pores, smoothes out wrinkles, and retones crepey tissue.

It is a further object of this invention to provide a unique process for formulating the facial cream composition of this invention in which a lanolin base stock is first formulated with water and epsom salt and alum, which is added to a cholesterol stock formulation, utilizing water and epsom salt and alum, with the ratio of eight parts of cholesterol stock to one part of lanolin stock. The methyl cellulose is added to the cholesterol stock advantageously to provide a high degree of stability.

The facial cream can be simply employed by the user with daily applications until the benefits are obtained through the wrinkle smoothing aspects and retoning of the skin. The formulation is stable, and due to its cream-like nature, which is of a fairly heavy degree of consistency, can be easily employed by hand.

The above are objects of this invention and further objects will be apparent to those skilled in the art in the light of the detailed description of the invention which follows.

In this formulation the principal active ingredients are epsom salts, i.e., magnesium sulfate, and ammonium alum, which are combined with a cholesterol base. The cholesterol provides an excellent foundation, due to its ready miscibility with aqueous solutions. The lanolin employed in the lanolin base stock is also a feature that is an important adjunct to the invention. The addition of lanolin contributes toward making a finished cream by making it smoother and more pliable, and also prevents it from being drying to the skin. The lanolin base emulsion takes five times its own volume of solution into emulsion, and thereby makes it possible to derive the benefits of the lanolin without reducing the efficiency of the cream. It will be noted in the description which follows that the formulations in both the cholesterol stock and the lanolin stock are somewhat similar with respect to the range of components employed contributing toward a compatible formulation when the two stocks are added together in the final emulsion.

The principal active ingredients, namely the epsom salts and the alum, are employed because of their effect on the skin in smoothing wrinkles and retoning the tissues. The alum has an almost instantaneous action and produces a rapidly observable effect. Ammonium alum of the various types of alum is preferred because of its superior results, but other forms, such as potassium alum, may be employed with some sacrifice in quality. However, the alum does not have the long term holding power of the slower acting epsom salts. If too much of the effect is derived from the alum at the expense of the epsom salt effect, the treatment will lose the long term benefits to be derived from the long hold power of the epsom salts. Therefore, in this formulation, the weight of the treatment is placed on the effect derived from the epsom salts by using a larger proportion and the alum is used only sparingly to provide a boosted initial effect. This balance is used in the preferred formulation, which will be shown in the example hereinbelow, as a delicate balance of ratio, but it will be understood that the ranges of components may be varied somewhat and known equivalents may be employed without varying from the teaching of this invention. The amount of salts employed in the formulation also represents a balance between achieving the highest possible concentration of salt without in any way sacrificing texture or ease of application and the stability of the cream. As a result, the facial cream formulation provided is of a high degree of effectiveness in the wrinkle smoothing field.

DESCRIPTION OF THE INVENTION

For the purpose of illustration of this invention, there is shown below a preferred example. It is to be understood that this example is for the purpose of illustration only, however, and that the invention is not limited thereto.

Example

CHOLESTEROL STOCK

| | Weight (oz.) | Percent | Range, percent |
|---|---|---|---|
| Cholesterol | 16 | 11.18 | 11–13 |
| Methyl cellulose | ¹4(0.14) | 0.10 | 0.05–0.50 |
| Water | 43 | 30.03 | 30–32 |
| Epsom salt | 71 | 49.60 | 48–50 |
| Ammonium alum | 31 | 9.09 | 5–11 |
| | 143.14 | 100.00 | |

¹ Grams.

LANOLIN STOCK

| | Weight (oz.) | Percent | Range percent |
|---|---|---|---|
| Anhydrous lanolin | 16 | 11.59 | 11–13 |
| Water | 43 | 31.16 | 30–32 |
| Epsom salt | 68.5 | 49.64 | 58–50 |
| Ammonium alum | 10.5 | 7.61 | 5–11 |
| | 138.0 | 100.00 | |

FINAL FORMULATION OF 8 PARTS OF CHOLESTEROL STOCK AND 1 PART OF LANOLIN STOCK

|  | Weight (oz.) | Percent | Range, percent |
| --- | --- | --- | --- |
| Cholesterol | 128 | 9.96 | 9–12 |
| Lanolin | 16 | 1.24 | 1–2 |
| Methyl cellulose | 1.14 | 0.09 | 0.04–0.45 |
| Epsom salt | 636.5 | 49.62 | 48–50 |
| Ammonium alum | 114.5 | 8.92 | 5–11 |
| Water | 387 | 30.17 | 30–32 |
|  | 1,283.14 | 100.00 |  |

PREPARATION OF THE CHOLESTEROL STOCK

The methyl cellulose, is first prepared in an aqueous dispersion. The dispersion must be created by using one-third of the total water at boiling temperature, which is mixed with the methyl cellulose until a lump free dispersion is formed. Hydration of the methyl cellulose is accomplished then by adding the balance of the water cold with agitation. Agitation is carried out thoroughly until the solution is complete. The solution then is warmed to 100 °F. and whipped into a foam.

The epsom salts and alum are added to the methyl cellulose foam. The solution is then warmed to 140° F., accompanied by constant agitation. Upon removal from heat, the solution is whipped at high speed. A perfume, such as two teaspoons of Rose soluble, may be added, where desired, at this point. The cholesterol, which has been previously melted, is slowly added while the batch is whipped at high speed. The batch should be continuously whipped at high speed until room temperature is obtained. If a homogenization process is desired to be employed, this batch is still soft and pliable.

The term cholesterol, as used herein, may include a group of alcohols and esters of cholesterol in aliphatic hydrocarbons, such as the product sold under the trademark Aquaphor. An example of the methyl cellulose is Methocel 65 HG, which has a methoxyl D.S. (degree of substitution) of 1.61–1.75 and a propylene glycol ether D.S. of 0.1–0.18.

PREPARATION OF LANOLIN STOCK PHASE

The epsom salt and alum and water are put into solution and heated until all of the salts are dissolved, which takes place around 140° F. The lanolin, in anhydrous form, is separately melted. The epsom salt and alum solution and melted lanolin are then combined and, where desired, two teaspoons of rose soluble may be added as a perfume or scent. The mixture is then whipped at high speed until cooled to 98° F.

When both the cholesterol and lanolin stocks are cooled to approximately 72° F., but before the cholesterol stock has had a chance to set, i.e., that is while it is still very pliable, the lanolin stock is carefully blended into the cholesterol stock in the amount of one part of lanolin stock to eight parts of cholesterol stock. This proportioning may be done on the basis of either volume or weight, since both the cholesterol stock and the lanolin stock have substantially the same density or volume to weight ratio. The aforementioned ratio is the preferred proportion but a range of one part of lanolin stock to six to nine parts of cholesterol stock may be employed. This blending is accomplished only after being well mixed and care is taken not to bruise or damage the emulsion.

It is an important feature of this invention that the method of production of the formulation be followed to obtain a stable emulsion. It has been determined that the most efficient way to prepare the formulation of the salt and alum with the base is to whip it at the high speed with a high powered mixer. With this method it is possible to whip into the base five times its own volume of solution. This affords a great increase in the strength of the finished cream making it a far more potent formula than has been produced heretofore. In the method of production, the careful blending of the cholesterol stock with the lanolin stock is effected in an eight to one ratio. This is important because the lanolin stock congeals at a much lower temperature (around 98° F.) than the cholesterol stock, which congeals at around 135° F. Because of this difference in congealing temperatures, it is possible to work in a stronger concentration of solution into the cholesterol base, whereas when attempt is made to process all of the components simultaneously in one vessel there is a condensing out of the salts in the form of grits as the lower congealing temperature of the cholesterol and lanolin combined will not support the higher concentration of salts. Further, in working out the ratio of the lanolin stock to be blended with the cholesterol stock, the balance arrived at is important, since if too much lanolin stock is admitted to the formula, there is a resultant sacrifice of efficiency and smoothness of application, whereas, if too little is used there is a deterioration of the emulsions.

Temperature control is also important. Thus, the temperature of the solution of the epsom salts and alum must be raised to 140° in order for the salts to be dissolved completely. However, if the temperature is raised beyond that point, the methyl cellulose begins to glob and gum up, and careful temperature control must be observed where methyl cellulose is employed to about one to two degrees variance.

The method for admitting the methyl cellulose into this formulation is important and unique. The methyl cellulose is used to stabilize the emulsion and is extremely delicate to handle, as it is not compatible with the salt solution. Thus, it is important that the process of the invention be followed where the methyl cellulose can be included in the formula by hydrating the methyl cellulose and then whipping the gelatin-like fluid into a foam before admitting the salts and alum. When the latter two ingredients are added, the methyl cellulose breaks down into minute particles. The solution then, after being heated to 140°, is ready for the gradual addition of the melted cholesterol, which is carefully poured in while the hot solution is being whipped at high speed. By this process, the methyl cellulose can be used in the cream and still achieve a product that is of smooth and uniform texture, while other methods result in a cream with small tapioca-like particles in it.

In this formulation the cholesterol acts as a binder for the epsom salt and alum solution by making a water-in-oil emulsion and, as is also the case with lanolin, it takes up to five times its own volume of solution in the emulsion and is the most efficient manner in which to hold a high concentration of the salts in the cream formulation upon application to the face. The unusually strong concentration of epsom salt and alum in solution has accordingly been made possible by support in the cholesterol and lanolin ointment or cream base. The process, as described, requires agitation or whipping at high speeds to provide a thick cream or ointment and is quite stable upon the completion of the process. Further, the lanolin provides a stabilized product and prevents the cream from being drying to the skin. The separate processing of the two stock phases, combined with careful temperature control and balancing of the ingredients, provides the finished formulation in the desired smooth texture with a high degree of stability. The stability is further enhanced by the use of the methyl cellulose stabilizer and the particular technique for admitting the methyl cellulose into the formulation.

The finished facial cream formulation provides a product of a high degree of quality, texture, smoothness, and stability, with a medium-heavy consistency. It is used as a facial mask in the same manner as the conventional clay base mask. Upon application for a fifteen minute period, as an example, it acts to firm the tissues, reduce pores, and smooth out wrinkles, and retone crepey tissue. The treatment provides the aforementioned effect and may be utilized repeatedly as with nightly treatment to derive cumulative benefits by the user with the end result being the eventual smoothing of wrinkles and retoning of tissue. The cream remains soft and pliable throughout the treatment by the user, and, upon the removal, may be returned to the jar to be re-used. The sensation provided during treatment is that of a mild drawing on the skin which provides a very soothing and pleasant sensation.

What is claimed is:

1. A method of preparing a cosmetic formulation for the skin consisting essentially of 48–50% magnesium sulphate, 5–11% ammonium alum, 9–12% cholesterol, 1–2% lanolin and 0.04–0.45% methylcellulose in weight percent, which comprises (a) preparing a cholesterol phase by first preparing an aqueous dispersion of 0.05–0.50% methyl cellulose, adding to said dispersion 48–50% magnesium sulphate, and 5–11% ammonium alum, and emulsifying therein 11–13% of cholesterol in melted form, (b) preparing a lanolin phase by dissolving in water 48–50% magnesium sulphate and 5–11% ammonium alum, and emulsifying therein 11–13% lanolin in melted form, (c) blending the lanolin phase (b) into the cholesterol phase (a) while the latter is still in a soft and pliable form, the ratio of phase (a) to phase (b) being 6–9:1.

2. The method of claim 1 in which said dispersion of methyl cellulose is prepared by mixing the methyl cellulose in boiling water, adding, when lump free, cold water with agitation, and thereafter warming to 100° F. and whipping into a foam prior to the addition of the magnesium sulphate, ammonium alum and cholesterol.

3. The method of claim 1 in which in the preparation of phase (a) the magnesium sulphate and ammonium alum are dissolved in the methylcellulose dispersion with heat accompanied by constant agitation, and thereafter whipped at high speed prior to addition of cholesterol, and in the preparation of phase (b) the magnesium sulphate and ammonium alum are dissolved in water with heat prior to the addition of lanolin.

4. The method of claim 3 in which, in the respective phases, the magnesium sulphate and ammonium alum are dissolved with heat at about 140° F.

5. The method of claim 1 in which, in the preparation of phase (a), the cholesterol is melted and slowly added with continuous whipping at high speed, and in the preparation of phase (b), after the addition of lanolin, the phase is whipped at high speed.

6. The cosmetic formulation prepared by the method of claim 1.

References Cited

UNITED STATES PATENTS

| | | | |
|---|---|---|---|
| 453,847 | 6/1891 | Paquette | 167—91 |
| 1,588,826 | 5/1923 | Wade | 167—63 |
| 1,550,026 | 7/1923 | Good | 167—91 |
| 1,496,545 | 4/1923 | Jones | 167—91 |
| 1,369,997 | 3/1921 | Wilson | 167—90 |

OTHER REFERENCES

De Navarre: Chem. & Manuf. of Cosmetics, D. Van Nostrand Co., N.Y., 1941, pp. 191–193, 261, 262.

Methocel: Dow Chem. Co., Midland, Mich., 1962, pp. 2, 11, 12, 21, 22.

Manuf. Chem., vol. XV, January 1944, pp. 13–16.

Janistyn: Riech. Seifen Kos, Huthig Verlag, Heidelberg, 1950, vol. I, pg. 260.

ALBERT T. MEYERS, Primary Examiner

A. P. FAGELSON, Assistant Examiner

U.S. Cl. X.R.

424—65, 68, 154, 365